United States Patent [19]

Lalancette et al.

[11] Patent Number: 4,479,828
[45] Date of Patent: Oct. 30, 1984

[54] LIGHT COLORED AND LOW DENSITY MINERAL FILLER FROM MAGNESIUM SILICATE

[75] Inventors: Jean M. Lalancette, Sherbrooke; Hugues Hamelin, Saint-Léonard, both of Canada

[73] Assignee: Societe Nationale de L'Amiante, Quebec, Canada

[21] Appl. No.: 543,002

[22] Filed: Oct. 18, 1983

[51] Int. Cl.³ .............................................. C09C 1/36
[52] U.S. Cl. ................................. 106/308 B; 106/306; 106/309
[58] Field of Search ............... 106/308 B, 309, 306

[56] References Cited

U.S. PATENT DOCUMENTS

| | | | |
|---|---|---|---|
| 2,212,446 | 8/1940 | MacIntire | 423/176 |
| 2,283,758 | 5/1942 | Pike | 423/637 |
| 3,862,294 | 1/1975 | Engelhart | 423/155 |
| 3,966,884 | 6/1976 | Jacob | 423/331 |
| 3,967,974 | 7/1976 | Ohnemuller | 106/306 |
| 4,277,449 | 7/1981 | Lalancette | 423/167 |

Primary Examiner—Herbert S. Cockeram
Attorney, Agent, or Firm—Cushman, Darby & Cushman

[57] ABSTRACT

A light colored and asbestos free granular material of the invention is suitable for use as lightweight fillers in plastics and is derived from asbestos tailings wherein the $MgO:SiO_2$ ratio is at least 1.0, said granular material comprising particles consisting of a mixture of enstatite, forsterite and silica having a particle size of from −400 to −10 mesh, said particles being coated with a silicate bonded layer of calcium oxide or magnesium oxide or mixtures thereof, said particles being further characterized by having a density of from 17 to 25 $lb/ft^3$ and having a degree of whiteness within the range of from 50 to 60 when measured by the ASTM Procedure No. E-97-77.

4 Claims, No Drawings

LIGHT COLORED AND LOW DENSITY MINERAL FILLER FROM MAGNESIUM SILICATE

BACKGROUND OF THE INVENTION

It is known in the plastic field to incorporate fillers into resins to provide various advantages known in the art. When light coloured plastics are to be prepared, the fillers of choice are calcium carbonate (also known as calcite), silica, dolomite and talc. The essential characteristics of the common filler are shown in Table I.

TABLE I
COMMON INORGANIC FILLERS

| Filler | Formula | Density lb/ft$^3$ | Whiteness |
|---|---|---|---|
| Calcite | $CaCO_3$ | 55 | 80 |
| Dolomite | $CaCO_3.MgO$ | 65 | 55 |
| Silica | $SiO_2$ | 40 | 85 |
| Talc | $3MgO.4SiO_2.H_2O$ | 45 | 75 |

Since the naturally occurring inorganic fillers are mined products mining costs becomes an important factor in their price. Also they present a disadvantage when they are to be used as fillers in lightweight plastic materials since in these cases a filler having a density lower than 40 lb/ft$^3$ will be required.

On the other hand, asbestos tailings as such could not be used as filler because of the presence of short asbestos fiber and because they have a bulk density of from about 40 to about 60 lb/ft$^3$ and in some cases their degree of whiteness is too low.

Accordingly, it would be highly desirable if means could be found to modify asbestos tailings by substantially reducing their specific gravity so that they could be used as lightweight fillers in plastics while maintaining their degree of whiteness within an acceptable level when compared with common in organic fillers such as dolomite and talc.

SUMMARY OF THE INVENTION

In accordance with the present invention, basic asbestos tailings are used to prepare a novel granulate material made up of a mixture of enstatite, forsterite and silica having a particle size of from $-400$ to $-10$ mesh and the mixture being coated on its surface with a silicate bonded layer of calcium oxide or magnesium oxide or mixtures thereof. The novel granulate material of the present invention is characterized by a whiteness of from 50 to 60 and a bulk density of from 17 to 25 lb/ft$^3$ and is asbestos free. The novel granulate of the present invention can be used to great advantage as filler in lightweight plastic where a light colour is desirable. The term 'basic asbestos tailings' whenever used herein is intended to cover asbestos tailings wherein the ratio $MgO:SiO_2$ is 1.0 or greater, whereas the term 'acidic asbestos tailings' is intended to cover asbestos tailings wherein the ratio $MgO:SiO_2$ is less than 1.0.

A first method for preparing the granulates of the present invention comprises leaching a slurry of asbestos tailings with an excess of carbon dioxide whereby magnesium carbonate is precipitated on the surface of the asbestos tailings and after separating the thus coated asbestos tailings subjecting same to calcination whereby forsterite granules coated with magnesium oxide are recovered.

Another method comprises leaching a slurry of asbestos tailings and a source of calcium such as calcium carbonate, calcium oxide or calcium hydroxide with an excess of carbon dioxide whereby calcium carbonate is precipitated on the surface of the asbestos tailings and after separating the thus coated asbestos tailings subjecting same to calcination whereby forsterite granules coated with calcium oxide are recovered.

Alternatively, calcium carbonate or magnesium carbonate ground to a particle size of less than 325 mesh (Tyler) can be added to a slurry of asbestos tailings and after thorough mixing there is recovered by filtration calcium carbonate or magnesium carbonate coated asbestos tailings and after submitting same to calcination there is obtained forsterite granules coated with calcium oxide or magnesium oxide.

DETAILED DESCRIPTION OF THE INVENTION

The process of the present invention will be more readily understood by referring to the following detailed description.

MAGNESIUM OXIDE COATING

In accordance with one feature of the present invention, asbestos tailings in suspension in water are treated with an excess of carbon dioxide, whereby a small fraction of the magnesium which is solubilized in the form of magnesium bicarbonate, according to the following equation:

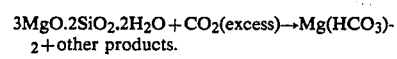

$$3MgO.2SiO_2.2H_2O + CO_2(excess) \rightarrow Mg(HCO_3)_2 + \text{other products.}$$

Upon subjecting this solution of magnesium bicarbonate to a temperature in the range of 100° C., the soluble magnesium bicarbonate is decomposed into an insoluble magnesium carbonate which is precipitated on the particles of asbestos tailings, thus coating the said particles with magnesium carbonate in accordance with the following equation:

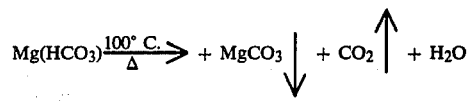

$$Mg(HCO_3)_2 \xrightarrow[\Delta]{100°\text{ C.}} + MgCO_3 \downarrow + CO_2 \uparrow + H_2O$$

In Table II, there is reported the amount of $MgCO_3$ extracted and then precipitated on the particles through this process.

Upon heating at a temperature above 800° C., the magnesium carbonate coated particles are then freed of asbestos and the carbonate decomposed to MgO. The thermal treatment in the range of 800°–1300° C. generates silica which is recombined with the MgO of the tailings or the MgO deposited at the surface of the tailing particles thus providing granules made up of a mixture of enstatite, forsterite and silica coated with magnesium oxide which is chemically bonded to outer surface of said granules by a thin layer of magnesium silicate.

TABLE II
LEACHING* AND PRECIPITATION OF $MgCO_3$ ON TAILINGS

| Sample of tailings | Weight of tailings (gm) | Weight of water for slurry (gm) | Precipitated $MgCO_3$ (gm) | Extracted Mg (%) |
|---|---|---|---|---|
| Bell Mines $-50 +200$ mesh | 50.0 | 500.0 | 0.3754 | 0.82 |
| Carey Mines | 50.0 | 500.0 | 1.3447 | 2.95 |

TABLE II-continued
LEACHING* AND PRECIPITATION OF MgCO₃ ON TAILINGS

| Sample of tailings | Weight of tailings (gm) | Weight of water for slurry (gm) | Precipitated MgCO₃ (gm) | Extracted Mg (%) |
|---|---|---|---|---|
| 100 +200 mesh Bell demagnetized | 50.0 | 500.0 | 0.1366 | 0.30 |
| −100 +140 mesh Carey demagnetized | 50.0 | 500.0 | 1.8466 | 4.05 |
| −100 +140 mesh Bell demagnetized | 50.0 | 500.0 | 0.3563 | 0.78 |
| −200 +325 mesh Carey demagnetized −200 +325 mesh | 50.0 | 500.0 | 3.5264 | 7.73 |

*One hour at 25° C., with a large excess of CO₂.

The different reactions involved can be summarized the following way:

(i) In the mass of the coating:

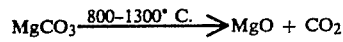
$$MgCO_3 \xrightarrow{800-1300°\ C.} MgO + CO_2$$

(ii) In the body of the particles:

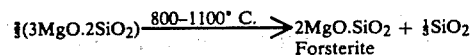
$$\tfrac{1}{3}(3MgO.2SiO_2) \xrightarrow{800-1100°\ C.} \underset{\text{Forsterite}}{2MgO.SiO_2} + \tfrac{1}{3}SiO_2$$

(iii) At the interface between coating and particles:

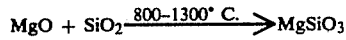
$$MgO + SiO_2 \xrightarrow{800-1300°\ C.} MgSiO_3$$

(iv) At high temperature in the body of the particles:

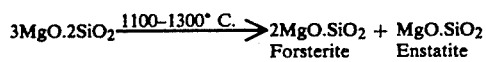
$$3MgO.2SiO_2 \xrightarrow{1100-1300°\ C.} \underset{\text{Forsterite}}{2MgO.SiO_2} + \underset{\text{Enstatite}}{MgO.SiO_2}$$

Reaction (iii) insures a strong adhesion between the coating and the particles by the formation of a chemical bonding.

CALCIUM OXIDE COATING

A coating of calcium oxide can be deposited on the particles of tailings if, to the slurry of tailings, a source of calcium is added such as CaO, Ca(OH)₂ or CaCO₃.

In the presence of an excess of CO₂, a soluble calcium bicarbonate is formed and is subsequently precipitated on the particles of tailings by ebullition of water. The equations describing the process are similar to those cited above for magnesium except that an external source of calcium is required.

CALCIUM OXIDE COATING BY DEPOSITION

It has been found that if a finely ground calcium carbonate or magnesium carbonate is added to a slurry of tailings and said slurry filtered after good mixing, the calcination of the resulting mixture gives the expected coated product. The particle size of the ground calcium carbonate or magnesium carbonate is preferably 400 mesh (Tyler) or smaller.

ASBESTOS TAILINGS

The asbestos tailings which are used in accordance with the present invention comprises demagnetized residues obtained after separation of the commercial asbestos fibers from the mined asbestos rock. Generally speaking, the particle size of the asbestos tailings varies from ¼" to −325 mesh (Tyler), the sizes varying with the type of asbestos rock mined and type of treatment which is particular to different mines. Furthermore, as stated previously the tailings will be either basic or acidic depending on the origin of the asbestos rock. An MgO/SiO₂ ratio greater than 1 establishes that the tailings are basic while an MgO/SiO₂ ratio of 1 or less makes the tailings acidic.

The demagnetization of asbestos tailings is carried out in accordance with procedures well known in the art.

In accordance with the present invention only basic and demagnetized asbestos tailings are suitable for the purposes of the present invention since it is only these tailings which will provide a granular material of the suitable density and degree of whiteness for use as fillers in plastics resins.

THE PRODUCT

The products obtained from these treatments are particles containing a body made of enstatite, forsterite and silica, the normal products resulting from the calcination of serpentine at high temperature. The coating on the particles is made of either magnesium oxide or calcium oxide depending on the method of treatment selected. This coating is bonded to the particle of calcined serpentine by the formation of either calcium or magnesium silicate thus insuring a fairly strong adhesion of the coating that can resist abrasion normally encountered in the course of handling or use. Also, the presence of this very refractory coating prevents sintering of the particles during the thermal treatment, sintering that is otherwise observed when tailings are calcined without a protective coating.

The granulometry of serpentine particles that can be beneficiated by this treatment starts at around 10 mesh (Tyler). With larger particles, the improvement of the colour and density is less marked. Although there is no lower limits to the size of particles that can be treated, +400 mesh (Tyler) can be indicated as the finest practical size.

Surprisingly, it has been found that this operation gave a much lighter product than the starting serpentine. Without going into limitative theoretical considerations, it is believed that the presence of the coating on the particles at the time of high temperature treatment, which is accompanied by a swelling when water is eliminated, prevents any sintering because of the highly refractory character of the coating and thus produces the observed lowering of density. The improvement of colour can be readily understood since either CaO,-CaSiO₃ or MgO,MgSiO₃ are white products.

Tailings from different mines are far from being equivalent starting material. It has been found that the implementation of this invention is much more attractive with basic tailings rich in brucite rather than with acidic tailings. In Table III, the different properties of two typical sources of tailings are presented: basic tailings from Carey Mines and acidic tailings from Bell Mines.

TABLE III

COLOUR AND DENSITY OF TAILINGS

| | Ratio MgO/SiO$_2$ | Total iron (%) | Bulk density* (lb/ft$^3$) | Whiteness** | Mesh sizes | T° Calcination (°C.) prior to coating |
|---|---|---|---|---|---|---|
| Basic serpentine (Carey Mines) | 1.19 | 4.21 | 39.5 | 63.0 | −100 +140 | — |
| Acidic serpentine (Bell Mines) | 1.00 | 7.26 | 58.6 | 40.8 | −100 +140 | — |
| Demagnetized serpentine (Carey Mines) | 1.60 | 1.78 | 39.9 | 66.2 | −100 +140 | — |
| Demagnetized serpentine (Bell Mines) | 0.96 | 3.10 | 59.0 | 42.9 | −100 +140 | — |
| Calcined basic de-magnetized serpentine (Carey) | 1.16 | 2.80 | 31.0 | 53.8 | −200 +325 | 1000 |
| Calcined basic serpentine (Carey) | 1.40 | 4.84 | 32.4 | 53.4 | −200 +325 | 1000 |
| Calcined acidic de-magnetized serpentine (Bell) | 0.90 | 3.51 | 55.0 | 35.2 | −200 +325 | 1000 |
| Calcined acidic serpentine (Bell) | 0.97 | 8.34 | 55.9 | 35.5 | −200 +325 | 1000 |

*ASTM Procedure D-1895-69 (1975), Method C.
**ASTM Procedure E-97-77.

EXAMPLES

A typical procedure for the treatment of tailings is the following.

(a) Coating with magnesium oxide

A slurry of tailings and water is prepared (ratio of 10 parts of water for one part of tailings). The slurry is then treated with an excess of CO$_2$ at 25° C. for one hour, with good stirring. The slurry is then heated to 100° C. for 15 minutes and filtered. The resulting filtrate is dried and calcined at the prescribed temperature.

(b) Coating with calcium oxide

The tailings and the prescribed amount of calcium material (for example, 2% by weight of CaCO$_3$ per unit weight of tailings) are slurried with ten times their weight of water and then treated as above. The source of calcium can be either Ca(OH)$_2$, CaO or CaCO$_3$.

(c) Calcium oxide coating by deposition

In this procedure, a decided weight of calcium or magnesium carbonate (for example, 1.5% of the weight of tailings of −400 mesh CaCO$_3$) is added to a 10% water slurry of tailings. After stirring at 25° C. for 15 minutes, the slurry is filtered and the filtrate is calcined after drying.

The results obtained from these experiments are reported in Table IV:

TABLE IV

THE FORMATION OF LIGHT MATERIAL FROM SERPENTINE

| STARTING MATERIAL | MgO/SiO$_2$ | BULK DENSITY (lb/ft$^3$) Before coating | BULK DENSITY (lb/ft$^3$) After coating | WHITENESS** Before coating | WHITENESS** After coating | MESH SIZES (TYLER) | T° CALCINATION (°C.) After coating |
|---|---|---|---|---|---|---|---|
| Example #1 Acidic demagnetized serpentine - MgO coated Method (a) | 0.96 | 59.0 | 50.5 | 35.2 | 30.6 | −200 +325 | 1200 |
| Example #2 Basic demagnetized serpentine - MgO coated Method (a) | 1.60 | 39.9 | 24.9 | 53.8 | 52.0 | −200 +325 | 1200 |
| Example #3 Acidic serpentine - CaO coated Method (b) | 1.00 | 58.6 | 44.3 | 35.5 | 37.4 | −50 +200 | 1250 |
| Example #4 Acidic demagnetized serpentine - CaO coated Method (b) | 0.96 | 59.0 | 44.8 | 35.2 | 43.9 | −100 +200 | 1000 |
| Example #5 Basic demagnetized serpentine - CaO coated Method (b) | 1.60 | 39.9 | 17.5 | 53.8 | 57.7 | −100 +200 | 1000 |
| Example #6 Acidic serpentine - MgO coated Method (a) | 1.00 | 58.6 | 51.2 | 35.5 | 37.1 | −100 +325 | 1100 |

TABLE IV-continued

THE FORMATION OF LIGHT MATERIAL FROM SERPENTINE

| STARTING MATERIAL | MgO/SiO2 | BULK DENSITY (lb/ft³) | | WHITENESS** | | MESH SIZES (TYLER) | T° CALCINATION (°C.) After coating |
|---|---|---|---|---|---|---|---|
| | | Before coating | After coating | Before coating | After coating | | |
| Example #7 | | | | | | | |
| Acidic serpentine - MgO coated Method (a) | 1.00 | 58.6 | 54.2 | 35.5 | 29.4 | −50 +200 | 1250 |
| Example #8 | | | | | | | |
| Basic serpentine - MgO coated Method (b) | 1.19 | 39.5 | 19.8 | 53.4 | 52.5 | −100 +325 | 1100 |
| Example #9 | | | | | | | |
| Basic serpentine - MgO coated Method (c) | 1.19 | 39.5 | 18.2 | 53.4 | 57.2 | −100 +200 | 900 |
| Example #10 | | | | | | | |
| Basic serpentine - CaO coated Method (c) | 1.19 | 39.5 | 18.9 | 53.4 | 59.6 | −100 +200 | 950 |
| Example #11 | | | | | | | |
| Basic serpentine - CaO coated Method (c) | 1.19 | 39.5 | 17.0 | 53.4 | 56.4 | −100 +200 | 975 |

*ASTM Procedure N° D-1895-69 (Reapproved 1975), Method C
**ASTM Procedure N° E-97-77.

ANALYSIS OF TABLE IV

The examination of the examples reported in Table IV indicates that the implementation of the invention is unexpectedly much more advantageous when performed with basic tailings rather than with acid tailings. With basic tailings, that is with material where the MgO to SiO2 ratio is above 1.00, the improvement on bulk density is quite substantial whereas with acidic tailings (MgO/SiO2 ratio ≦1) the improvement is rather small. This point is well shown by comparison of examples 1 and 2. In these examples, both materials have been demagnetized in order to reduce coloration induced by iron, after calcination. In the case of the basic tailings (example #2), the improvement of bulk density by coating is of 38%, but with acid tailings, a similar coating gave only an improvement of 14%. An almost similar situation is noted by comparing examples #4 and #5. Here, the coating agent is CaO rather than MgO and the temperature of calcination is lower (1000° C. rather than 1200). The gain in lowering of bulk density is much more important with the basic material (56%, example #5) than with the acidic one (24%, example #4). From these results, it becomes obvious that basic tailings are to be preferred as starting material.

Concerning the method of applying the coating, the method (c) is obviously the one to be preferred because of its simplicity and efficiency although methods (a) and (b) give acceptable results. The best results observed were in fact those shown by examples #9 and #10 where substantial gains are noted, both for bulk density (54%, 52%) and whiteness (7%, 12%).

As far as whiteness is concerned, it can be noted, as a trend, that coating with CaO, the improvement was superior to MgO coating.

As to the temperature of calcination, it is to be noted that the most substantial improvements in colour (examples #9, #10 and #11) were observed at temperatures below 1000° C. This point is also shown by comparison of examples #8 and #9. In both cases, the gain in bulk density is substantial, of the order of 50%, but the calcination at a high temperature (1100° C., in example #8) brings a net loss of colour whereas a lower calcining temperature (900° C. in example #9) allows a substantial gain in whiteness.

The improvement introduced by demagnetizing the tailings is more striking with acidic tailings (examples #1 vs #6) than with basic tailings (examples #2 vs #8). But this improvement shown by acidic tailings submitted to demagnetization is far from compensating for its poor overall performances in terms of aptitude to lowering of bulk density and improvement in whiteness when coated.

What is claimed is:

1. A light coloured and asbestos free granular material obtained from asbestos tailings wherein the MgO:SiO2 ratio is at least 1.0, said granular material comprising particles consisting of a mixture of enstatite, forsterite and silica having a particle size of from −400 to −10 mesh, said particles being coated with a silicate bonded layer of calcium oxide or magnesium oxide or mixtures thereof, said particles being further characterized by having a bulk density of from 17 to 25 lb/ft³ and having a degree of whiteness within the range of from 50 to 60 when measured by the ASTM Procedure No. E-97-77.

2. A light coloured and asbestos free granular material according to claim 1, wherein the particles are coated with a silicate bonded layer of calcium oxide.

3. A light coloured and asbestos free granular material according to claim 1, wherein the particles are coated with a silicate bonded layer of magnesium oxide.

4. A light coloured and asbestos free granular material according to claim 1, wherein the particles are coated with a silicate bonded layer of calcium and magnesium oxide.

* * * * *